Feb. 27, 1934.  P. E. DARLING ET AL  1,949,294
GEAR TRANSMISSION
Original Filed July 24, 1931    3 Sheets-Sheet 1
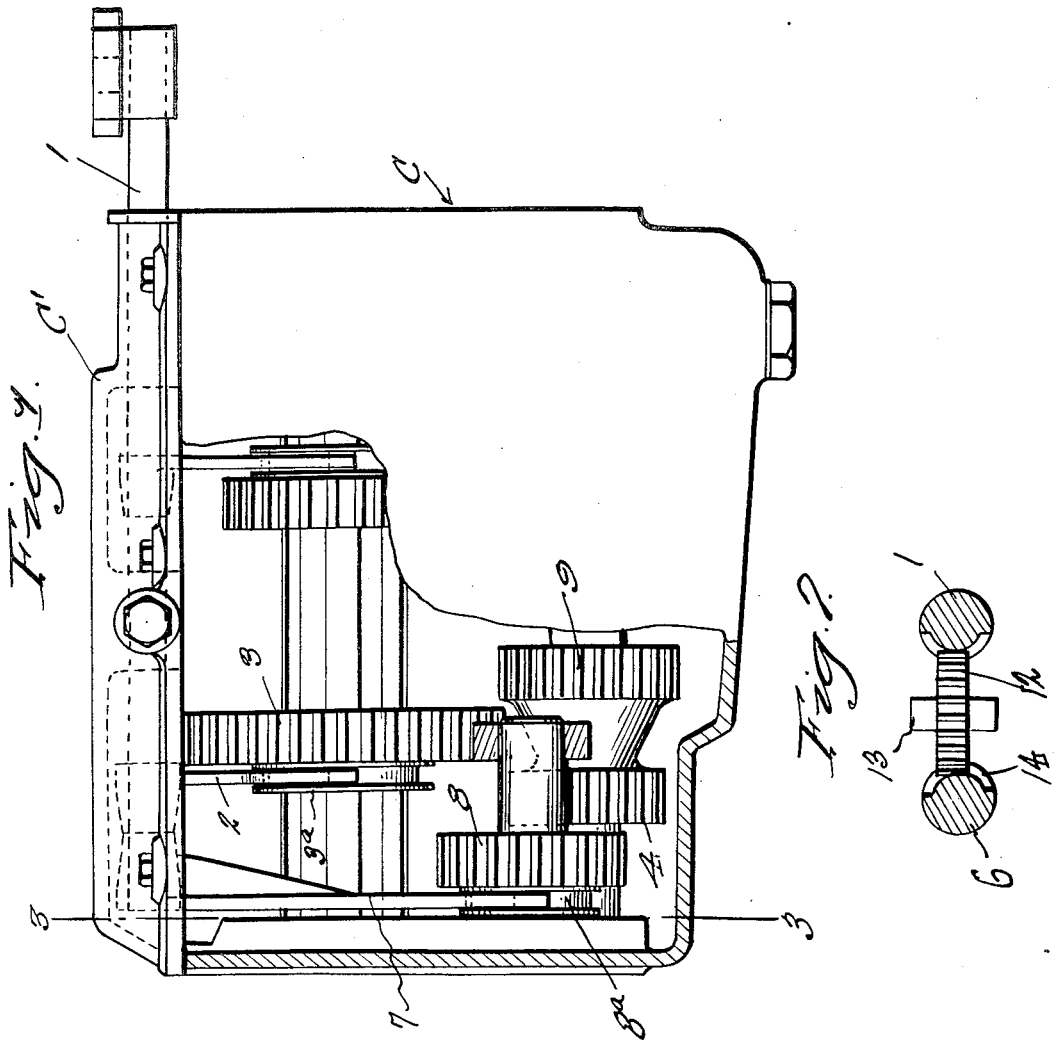
Inventor
Paul E. Darling
Frank T. Bromley
By Clarence A. O'Brien
Attorney

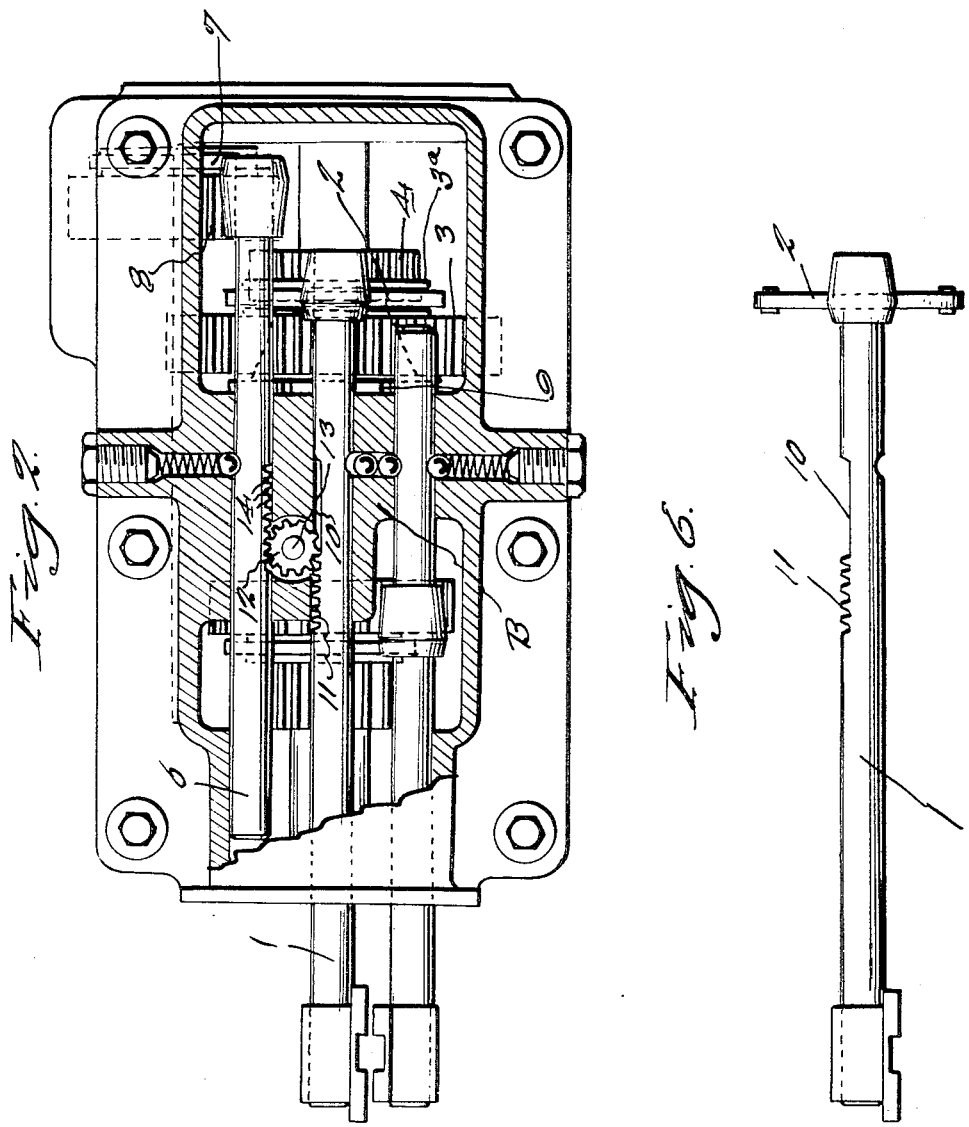

Feb. 27, 1934. P. E. DARLING ET AL 1,949,294
GEAR TRANSMISSION
Original Filed July 24, 1931  3 Sheets-Sheet 3
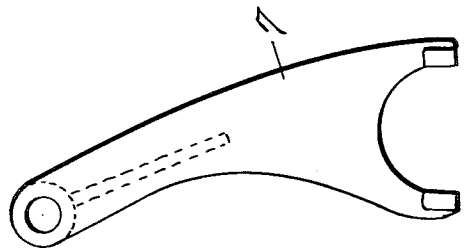
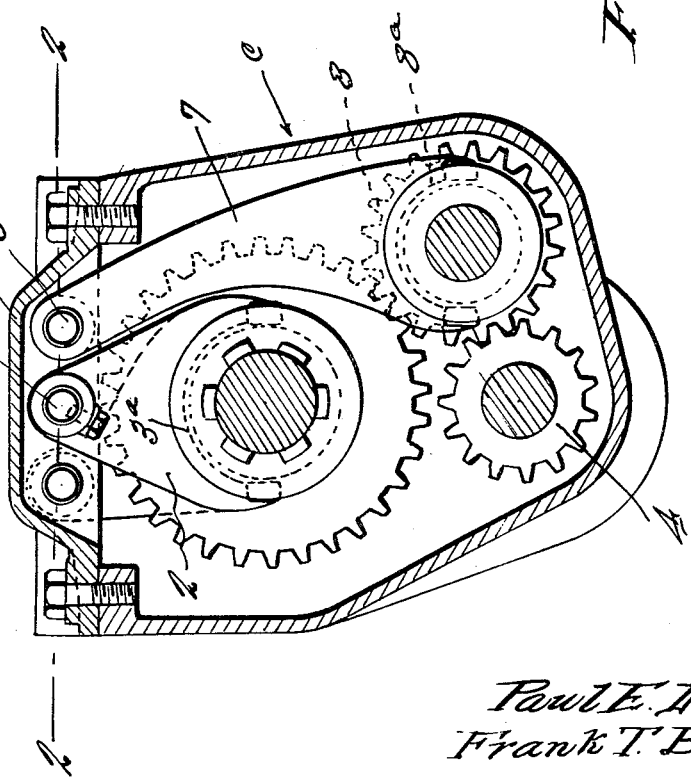
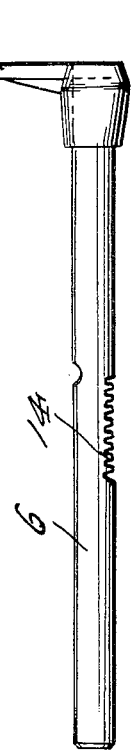
Inventor
Paul E. Darling
Frank T. Bromley
By Clarence A. O'Brien
Attorney Patented Feb. 27, 1934

1,949,294

UNITED STATES PATENT OFFICE 1,949,294

GEAR TRANSMISSION

Paul E. Darling and Frank T. Bromley, Lansing, Mich.

Application July 24, 1931, Serial No. 552,984
Renewed December 19, 1933

4 Claims. (Cl. 74—58)

This invention relates to certain new and useful improvements in gear type transmission for use in motor driven vehicles and the primary object of this invention is to eliminate all gear noise and hum always present in the conventional gear type transmission; and secondly to greatly reduce the cost of manufacturing such transmissions; and the invention broadly consists in the provision of a slidably mounted reverse idler gear, the gear transmission now in use having the idler transverse gear fixed on the stub shaft usually provided therefor.

The invention, together with many other objects and advantages thereof will be apparent from a study of the following description, taken in connection with the accompanying drawings wherein:

Figure 1 is a view partly in section and partly in elevation, the gear case of a transmission being broken open to clearly illustrate the invention as applied to the transmission.

Figure 2 is a longitudinal sectional elevational view taken substantially on the line 2—2 of Figure 3.

Figure 3 is a transverse sectional view taken substantially on the line 3—3 of Figure 1.

Figure 4 is a plan view of a shifter-rod forming part of the invention.

Figure 5 is an elevational view of a shifter fork forming part of the invention.

Figure 6 is a plan view of a second shifter rod forming part of the invention.

Figure 7 is a fragmentary detail sectional elevational view showing the rack and pinion means for connecting the shifter rod of Figures 4 and 6.

With reference more in detail to the drawings, it will be seen that the invention is applied to a somewhat conventional gear type of transmission which embodies among other parts a casing C within which are arranged the shafts and gears of the transmission of which, only those with which this invention is concerned being herein definitely alluded to.

The cover C' of the casing on its inner side, is provided with the usual boss structure B which accommodates the shifting rods of the transmission, of which rods this particular invention is concerned only with that shifter rod which controls the first and reverse speed gear, and herein designated by the reference character 1. The shifter rod 1 is provided at the rear end with a fork 2 engaging a grooved collar 3a provided on the first and reverse transmission gear 3.

According to the present invention, there is shiftably supported in the boss structure B an auxiliary shifter rod 6 paralleling the shift rod 1 and equipped at its rear ends with a shifting fork 7 which engages, in accordance with the present invention, a collar 8a provided on the reverse idler gear 8.

Heretofore, and as before stated, the idler gear 8 was mounted on its shaft against movement relative thereto, and according to the present invention, the gear 8 is slidably splined to its shaft for shifting movement relative thereto into and out of engagement with the reverse speed transmission gear 4. Thus it will be seen that provision is made for maintaining gears 4 and 8 out of mesh with one another during "forward drive" and for meshing these gears to provide a reverse drive.

The shifter rod 1 is provided with a lateral groove 10, and at the rear end of the groove with a longitudinal series of rack teeth 11 adapted to mesh with a pinion 12 journalled on a vertical pin 13 suitably mounted in the boss structure B between the rods 1 and 6. The pinion 12 is also in mesh with a longitudinal series of lateral rack teeth 14 provided on the shifter rod 6.

From what has been hereinbefore stated, it will be apparent, that shifting movement of the rod 1 in one direction may be imparted to the rod 6 for shifting the latter in a direction opposite to the direction of movement of the rod 1, thereby effecting simultaneous shifting movement of gears 3 and 8 whereby gear 8 will be moved in a forward direction into mesh with the reverse gear 4, and gear 3 will be moved in a rearward direction into mesh with the gear 8 thus providing for a reverse drive. Shifting movement of the rod 1 for shifting the gear 3 forwardly into mesh with the first gear 9 of the transmission can be effected, without effecting a shifting of the rod 6 due to the fact that required direction of movement of rod 1 for effecting this shift into first speed will cause the teeth 11 to move away from the pinion 12, the teeth of the pinion being received in the groove 10, consequently no rotative movement is imparted to the pinion, and the position of the rod 6 will remain undisturbed, that is the position of the rod 6 will be such that idler gear 8 will be located as shown in Figure 1 and out of mesh with the reverse gear 4.

Obviously then by reason of the above, the normal position of gear 8 will be such as that shown in Figure 1 so that during all forward speeds, gear 8 will be out of mesh with gear 4 and only upon shifting of the transmission into reverse speed will gear 8 be moved into mesh with the gear 4, this meshing of gears 4 and 8 being accomplished in a manner already herein described in detail.

In providing a gear transmission with a reverse idler gear slidable into and out of engagement with the counter shaft reverse gear, not only is there eliminated the noise and hum caused by the intermeshing of these gears during forward drive, but the cost of transmission construction is materially reduced. This is apparent, from the fact, that in the gear transmissions now in use, there is entailed many costly processes of machining, locking and fitting these gears (reverse idler gear and reverse counter shaft gear) with the highest degree of accuracy and precision, in order that they will not produce excessive noise. Many gears, after having been put through these expensive processes still have to be rejected and thrown away, resulting in great loss to the manufacturer.

Thus through the medium of the present invention, the cost of manufacturing of gear transmission, is reduced materially, and the usual hum and noise, apparent at all car speeds, and even when the motor is idling and the transmission is in neutral, is also eliminated. While the invention has been shown, associated with an automotive transmission, it is, of course, understood that it is equally applicable for use for shifting gears in various other types of transmissions in a noiseless and efficient manner.

Even though we have herein shown and described the preferred embodiment of the invention, it is to be understood that the same is susceptible of further changes, modifications and improvements coming within the scope of the appended claims.

Having thus described our invention, what we claim as new is:

1. In a transmission mechanism including spaced fixed gears and coacting movable gears, means for shifting said movable gears, said means when actuated in one direction from a neutral position connecting the movable gears to each other and one of the movable gears to one of the fixed gears and when moved in a different direction from its neutral position connecting the other of the fixed gears to one of the movable gears and maintaining the other gears in their inoperative position.

2. In a transmission mechanism including spaced fixed gears and coacting movable gears, means for shifting said gears comprising parallel disposed actuating rods each connected to one of the movable gears, means operatively connecting the actuating rods for simultaneous operation when one of the rods is moved in one direction from a neutral position, and means for rendering the other rod inoperative when the first mentioned rod is moved in an opposite direction from the neutral position.

3. In a transmission of the character described including a shiftable first gear, a fixed reverse gear, a fixed first gear, a shiftable reverse gear for controlling the drive connection between the first gear and said fixed reverse gear, movable means arranged when moved in one direction from its neutral position to move the shiftable gears into mesh and the shiftable reverse gear into engagement with the fixed reverse gear, said movable means when moved in an opposite direction from its neutral position effecting engagement of the shiftable first gear with the fixed first gear and maintaining the shiftable reverse gear out of engagement with the fixed reverse gear.

4. In a transmission mechanism of the class described including spaced axially disposed fixed gears and two movable gears, one of said fixed gears being normally positioned between said movable gears, means for shifting said movable gears comprising a main actuating rod operatively connected to one of the movable gears, an auxiliary actuating rod operatively connected to the other of the movable gears, said actuating rods being parallel disposed relative to each other and provided with opposed ratchet teeth, a pinion engaging said teeth, the teeth on the main actuating rod terminating in a flat groove adjacent the opposed end of the teeth on the auxiliary actuating rod whereby when the main actuating rod is moved in one direction from its neutral position it causes the simultaneous operation of the auxiliary actuating rod to bring the movable gears into mesh and one of the movable gears into mesh with one of the fixed gears and when the main actuating rod is moved in an opposite direction it brings one of the movable gears into engagement with the other of the fixed gears and positions the groove in the main actuating rod in register with said pinion so as to prevent the movement of the auxiliary actuating rod.

PAUL E. DARLING.
FRANK T. BROMLEY.